(12) United States Patent
Miklosi

(10) Patent No.: US 6,416,121 B1
(45) Date of Patent: Jul. 9, 2002

(54) FOLDING TOP MECHANISM OF A FOLDING ROOF FOR A CONVERTIBLE

(75) Inventor: Stefan Miklosi, Munich (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/655,932

(22) Filed: Sep. 6, 2000

(30) Foreign Application Priority Data

Sep. 6, 1999 (DE) .......................................... 199 42 426

(51) Int. Cl.⁷ .................................................. B60J 7/00
(52) U.S. Cl. .................................. 296/219; 296/220.01
(58) Field of Search ........................ 296/100.11, 100.12, 296/100.14, 107.09, 107.13, 107.16, 107.18, 107.19, 108, 219, 107.2, 220.01

(56) References Cited

U.S. PATENT DOCUMENTS

| 4,893,868 | A | * | 1/1990 | Miller et al. ................. 296/219 |
| 5,052,747 | A | * | 10/1991 | Kubota et al. ............... 296/219 |
| 5,897,160 | A | * | 4/1999 | Reihl et al. ............. 296/220.01 |
| 5,938,271 | A |   | 8/1999 | Schuler et al. |
| 5,975,620 | A |   | 11/1999 | Jambor et al. |

FOREIGN PATENT DOCUMENTS

| DE | 42 03 228 | 8/1993 |
| DE | 197 31 330 | 2/1999 |

* cited by examiner

Primary Examiner—Stephen T. Gordon
Assistant Examiner—Jason S Morrow
(74) Attorney, Agent, or Firm—Nixon Peabody LLP; David S. Safran

(57) ABSTRACT

A folding top mechanism of a folding roof for a convertible, which has side roof rods with a guide means for movable support of the front bow and of the middle bow and a canvas folding top which is attached to the front bow, and which can be moved into a rear lowered position to open the folding roof, with the front bow being pushed at least partially over or under the middle bow by the guide means.

16 Claims, 8 Drawing Sheets

FOLDING TOP MECHANISM OF A FOLDING ROOF FOR A CONVERTIBLE

BACKGROUND OF THE INVENTION

1. Field of the Invention

The invention relates to a folding top mechanism of a folding roof for a convertible, which has side roof rods with a guide means for movable support of the front bow and of the middle bow and a canvas folding top which is attached to the front bow, and which can be moved into a rear lowered position to open the folding roof.

2. Description of Related Art

Published German Patent Application DE 197 34 671 A1 discloses a folding roof which has a front bow which is guided on a side frame of the folding top and a canvas folding top which is attached to the front bow and which is guided in sealing rails of the side top frame for displacement when the folding roof is opened and closed. To open the folding roof, the front bow on the frame of the folding top is pushed to the rear, entraining the canvas folding top and pushing it together into folds according to the lateral guides of the canvas folding top in the sealing rails.

SUMMARY OF THE INVENTION

The primary object of the present invention is to provide a folding top mechanism of the initially mentioned type which ensures a simple sequence of motions when the bows are moved with consideration of orderly folding of the canvas folding top.

This object is achieved in accordance with the invention in the aforementioned folding top mechanism in that the front bow can be pushed at least partially over or under the middle bow by the guide means. By moving over one another, the free section of the canvas folding top is pulled to the rear between the front bow and the middle bow from the rear edge of the front bow over or under the middle bow so that the canvas folding top falls into a Z-fold. This orderly lowering of the canvas folding top is facilitated if, for example, the canvas folding top is attached to the middle bow since, then, the irregular lateral yield of the canvas folding top which may occur is reliably prevented. Furthermore, the moving over one another yields a compact arrangement of the front bow and middle bow which is short in the lengthwise direction of the vehicle and which is advantageous when the folding roof is lowered.

To facilitate the sequence of movements when the canvas folding top is being folded, it is advantageous if, during the backward displacement of the front bow which is moved by the drive on the guide means against the middle bow, the middle bow is fixed on the guide means by a lock means until the front bow is positioned in a defined manner on the middle bow with the formation of a Z-fold of the canvas folding top. This ensures that the middle bow cannot shift to the rear on the frame of the folding top when the front bow is pushed to the rear.

One practical embodiment of the invention calls for the front bow, in its defined arrangement on the middle bow, being coupled to the middle bow by a coupling means and the middle bow being fixed by the lock means being disengaged so that the driven front bow and the middle bow form a movable bow unit. Thus, by means of a drive which acts on the front bow, the entire bow unit can be pushed with the Z-folding being preserved. The displacement can be performed in both displacement directions, i.e., during opening and also closing of the canvas folding top and the folding roof.

The guide means for the two bows can have guide rail on each of the two side roof rods. The middle bow can be blocked by the lock means having a pre-tensioned lock rocker which is located on the bearing unit of the middle bow with a lock hook which fits into a recess on the guide rail for fixing the middle bow.

To cancel the blocking of the middle bow, it is advantageous if the lock rocker can be swung by the front bow, which is pushed onto the middle bow, and can be released from the fixing engagement. Then, the lock hook can be forcibly raised by the moving front bow in a single sequence of motion. The opposite motion sequence causes blocking of the middle bow when the front bow moves away from the middle bow.

In a preferred embodiment, the lock rocker, which swings in the respective direction, couples and uncouples the middle bow on the front bow.

If at least one other middle bow is movably supported on the guide means or the guide rails and can be fixed according to the first middle bow and can be moved as a unit with the front and middle bow after its fixation is released, proper folding of the canvas folding top be ensured even for longer folding roofs. In this way, different open positions of the folding roof with roof openings of different sizes can also be set.

For at least partial travel of the front bow over the middle bow, it is advantageous if each side guide rail has its own guideway for the sliding means of the front bow and for the sliding means of the middle bow, so that the sliding means can be moved next to one another. Thus, the sliding means can be located next to one another on the guide rail in a space-saving manner or can also be moved past one another when this is necessary for a compact arrangement. The sliding means can be made such that they have at least one sliding element which is movably held on the respective guideway.

The mechanism of the folding top is preferably made such that the side roof rod is pivotally connected by a pivot joint to a side part of the main bow, and that to lower the folding roof into the storage space, the roof rod is swung in, the pivoting, motion of the roof rod taking place, for example, in a roughly horizontal plane of the motor vehicle. Furthermore, the mechanism of the folding top can have a roof cassette which is formed from the side part and the main bow and which is pivotally supported on the body via a respective parallelogram-like four-bar arrangement which contains the main column and a main connecting rod.

The drive for the front bow can be located on the main bow, the roof cassette or the rear roof rod and is connected via cable pulls or Bowden cables to the front bow.

With the described mechanism of the folding top, a partial opening of the folding top for ventilation of the interior can be established by moving the front bow, the canvas folding top being placed into a Z-shaped fold which offers little air resistance and does not tend towards fluttering. Thus, this operation can be performed even while driving.

These and further objects, features and advantages of the present invention will become apparent from the following description when taken in connection with the accompanying drawings which, for purposes of illustration only, shows a single embodiment in accordance with the present invention.

DETAILED DESCRIPTION OF THE INVENTION

Figure 1:
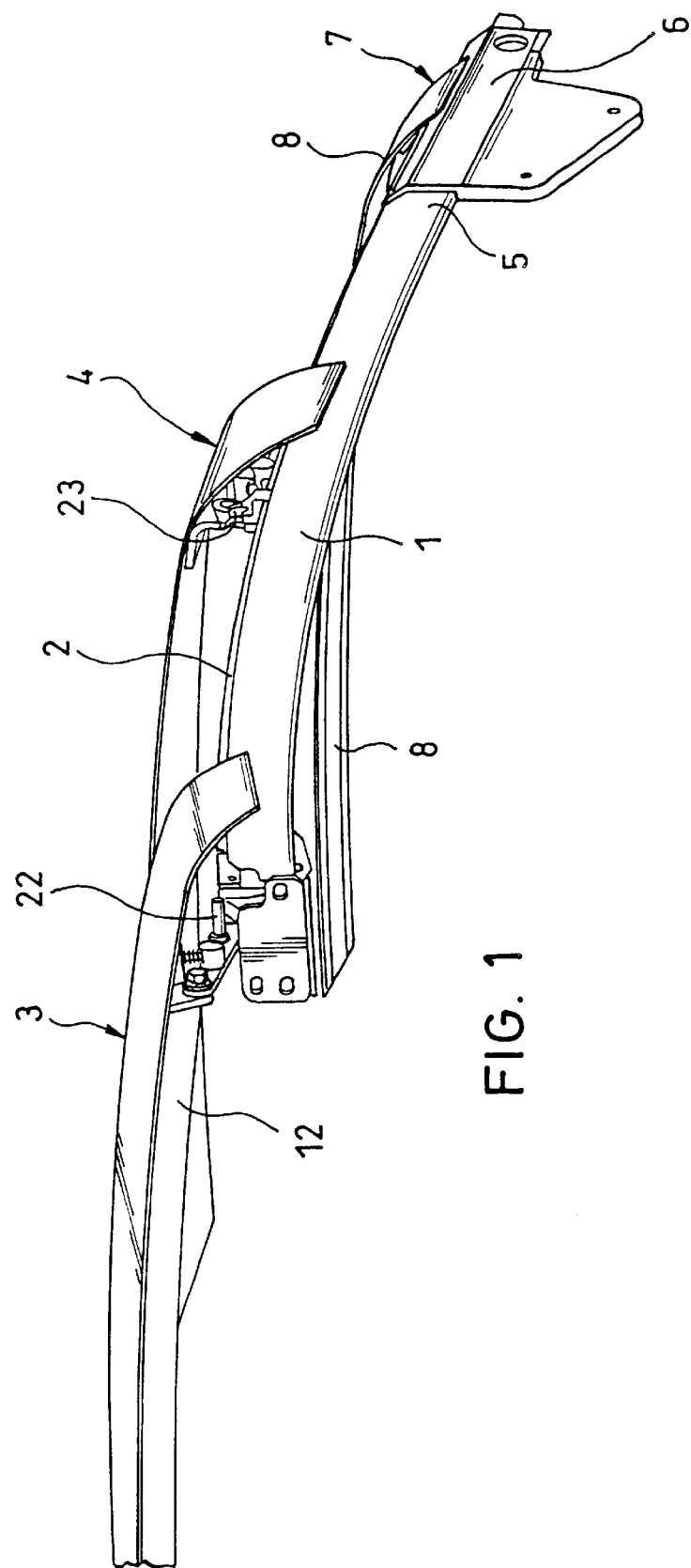
FIG. 1 is a perspective view showing a portion of a folding top mechanism of a folding roof for a convertible.

The mechanism of a folding top contains a side roof rod 1 (see FIG. 1 in which only the left half of the folding top mechanism is shown, the right being the mirror image thereof) with a guide rail 2, on which the front bow 3 and the middle bow 4 are movably supported. On its back end 5, the roof rod 1 is connected to a side part 6 of a roof cassette 7. The roof cassette 7 contains a main bow 8 which forms a permanent connection between the left side part 6 and the corresponding opposite right side part.

The bearing unit 9 of the front bow 3 (see FIG. 2) contains a rest 11 which is supported on a sliding element 10 (see FIG. 5) on the guide rail 2 and on which a cross beam 12 of the front bow 3 is supported to be able to pivot on a pin 13. The cross beam 12 is pre-tensioned by a spring 14 in the direction of a position which is inclined forward and downward.

Figure 2:
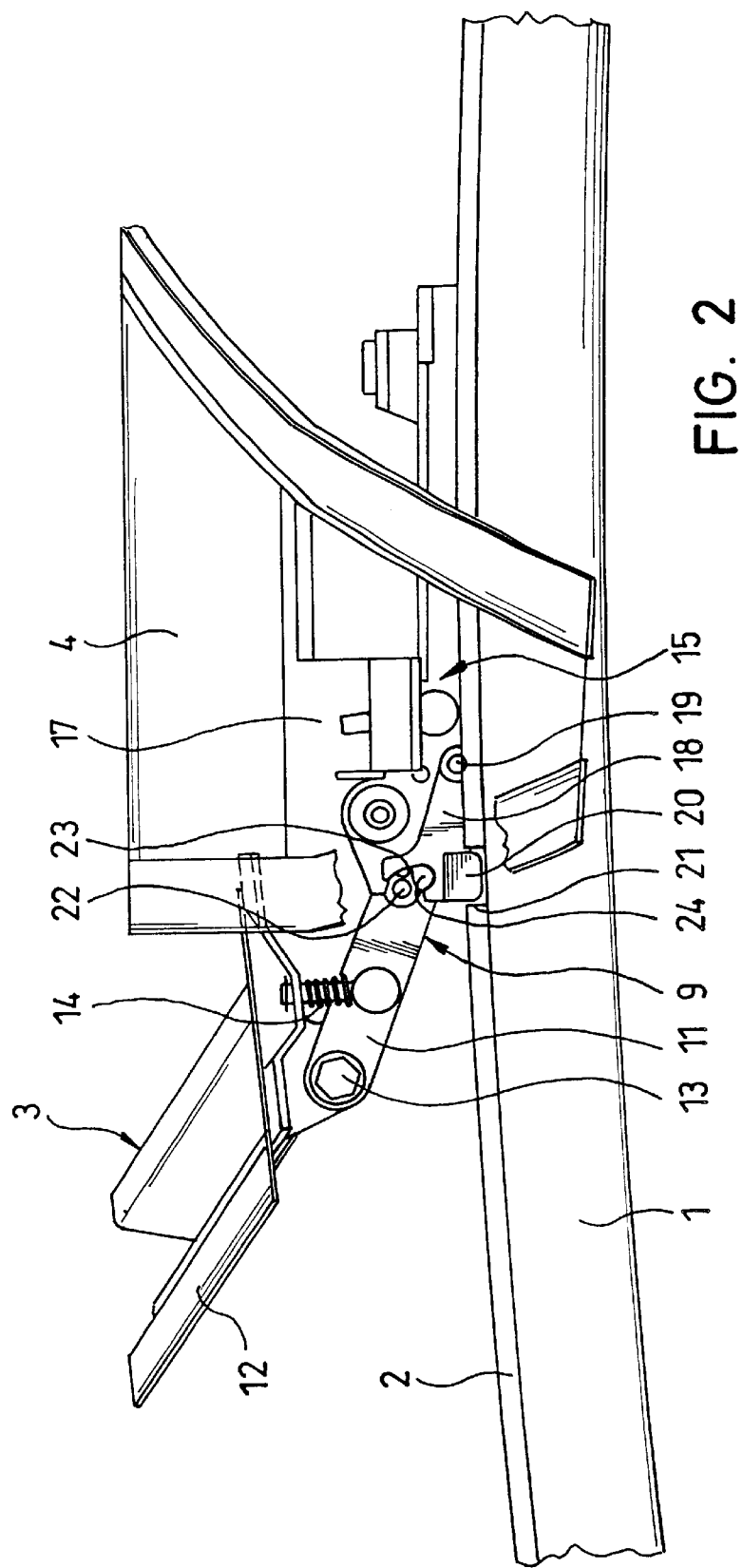
FIG. 2 is a schematic side view a front bow and a middle bow on a guide of the folding top mechanism in a position with the middle bow locked.

The bearing unit 15 of the middle bow 4 contains a rest 17 which is supported by a sliding element 16 (see FIG. 5) on the guide rail 2 and to which the middle bow 4 is attached. A lock means for fixing the middle bow 4 on the guide rail 2 and for blocking it against displacement has a lock rocker 18 which is mounted to be able to pivot around the horizontal rocker axis 19 on the bearing unit 15. The lock hook 20 of the lock rocker 18 is pre-tensioned by a spring of the lock rocker 18 against the guide rail 2 and is pressed into a recess 21 in the guide rail 2 in the lock engagement position, as shown in FIG. 2, so that the middle bow 4 is fixed on the guide rail 2 and is blocked against displacement along the guide rail 2.

Figure 3:
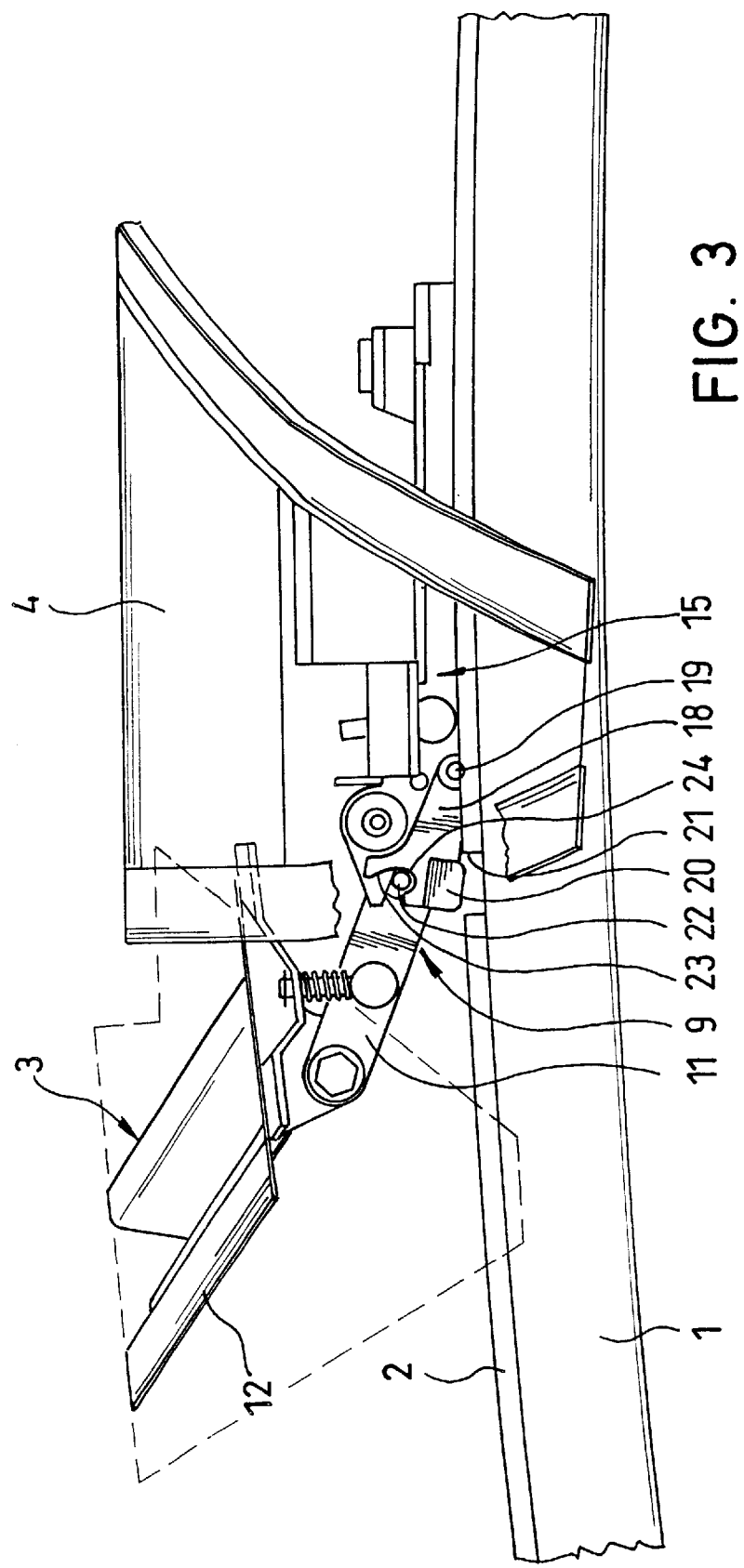
FIG. 3 is a schematic side view corresponding to that of FIG. 2, in a position with the middle bow unlocked.

When the front bow 3 is pushed against the middle bow 4, by a drive (not shown), for example via a conventional drive cable, a driving pin 22 which projects laterally from the rest 11 of the bearing unit 9 of the front bow 3 presses against a stop surface 23 on the lock rocker 18 which thereupon swings up and lifts the lock hook 20 out of the recess 21, by which fixation of the middle bow 4 is canceled (see, FIG. 3). In doing so, the driving pin 22 is held in a recess 24 on the lock rocker 18, thus establishing the coupling of the front bow 3 and the middle bow 4 and enabling displacement of the driven front bow 3 and the middle bow 4 as a unit in both directions of displacement along the guide rail 2.

Figure 4:
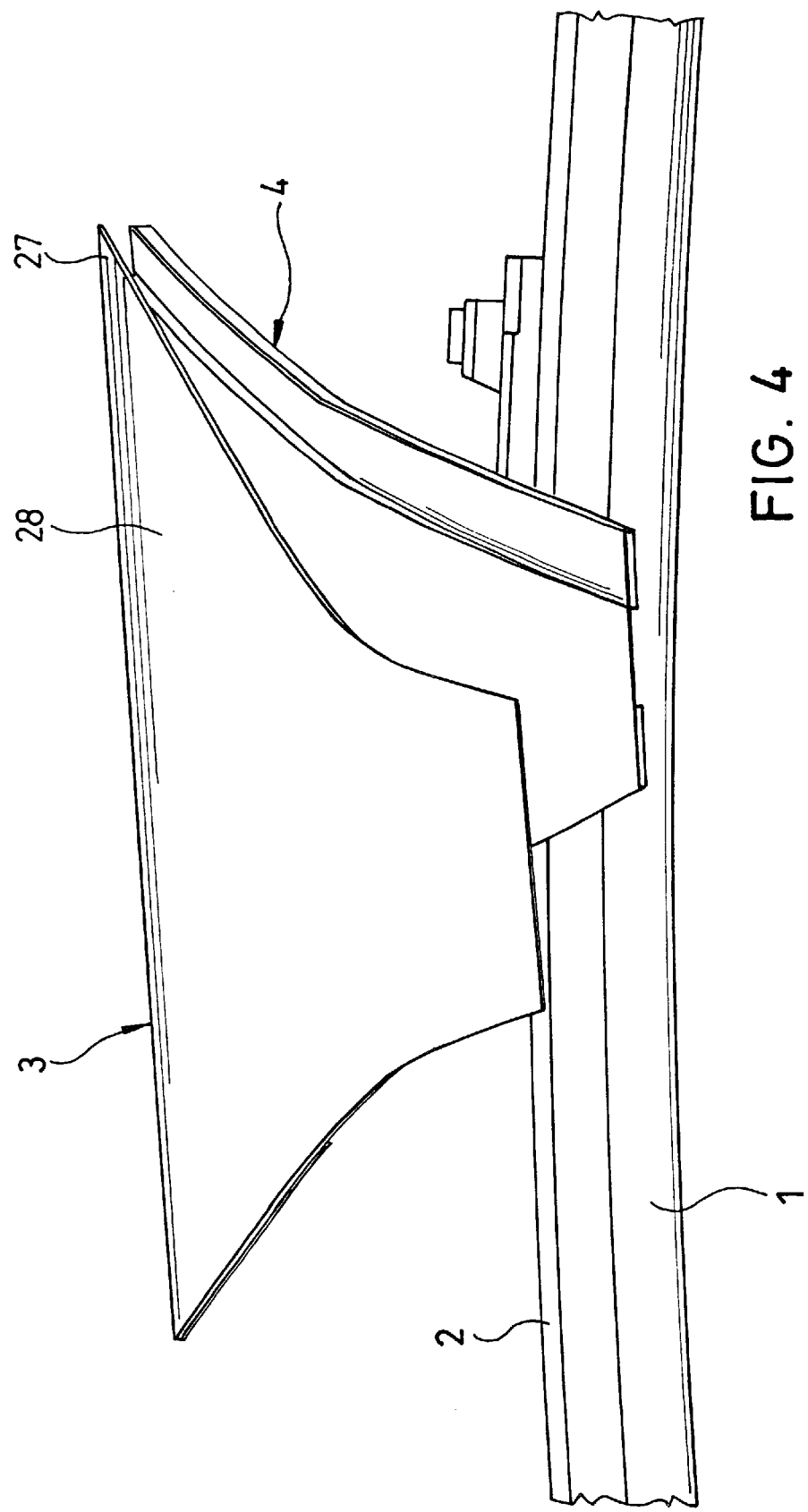
FIG. 4 is a side elevational view showing the front bow in its arrangement over the middle bow.
Figure 5:
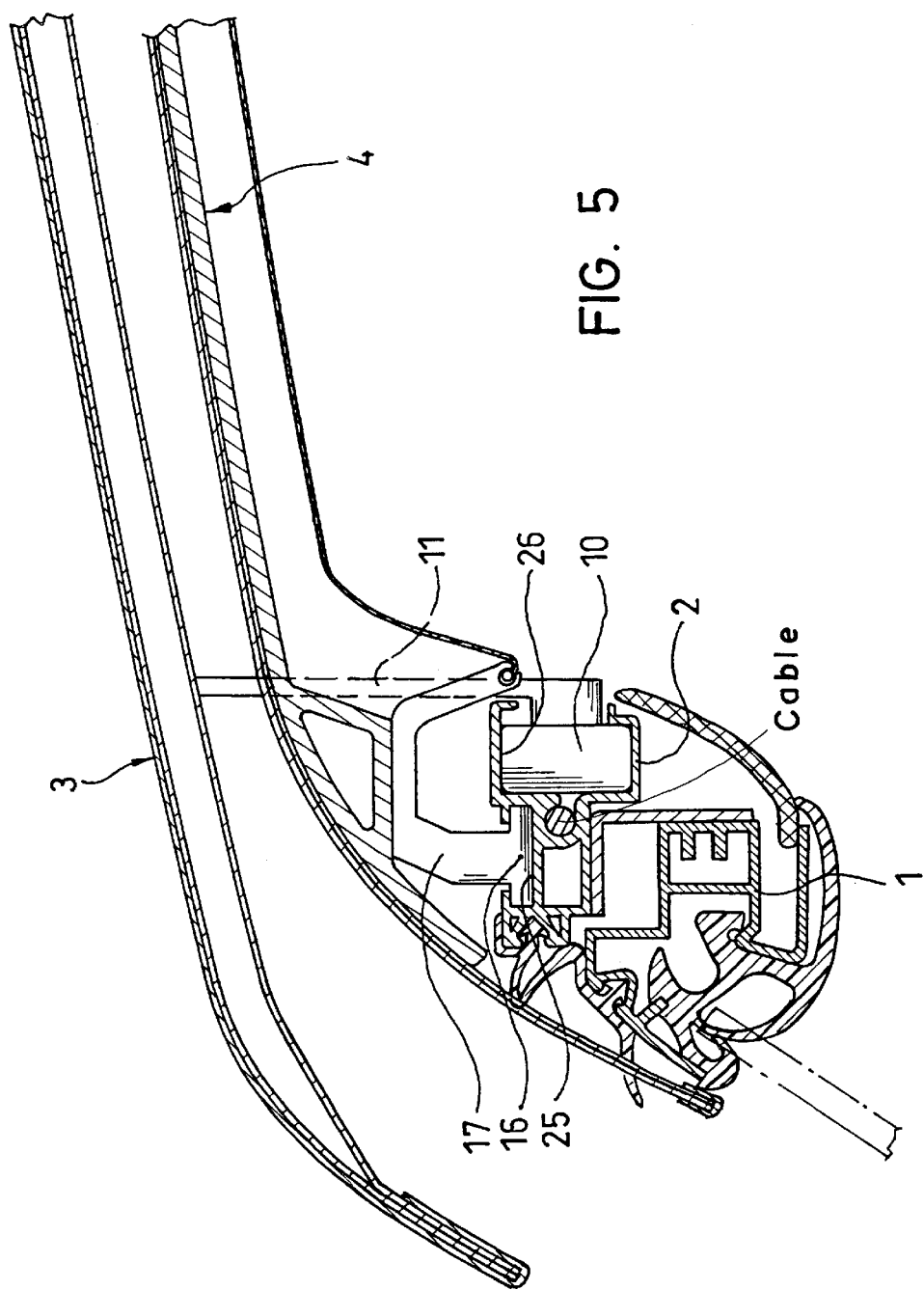
FIG. 5 is a schematic cross-sectional view of the guide of the folding top mechanism with the front bow and the middle bow supported thereon.

The guide rail 2, which is attached to the roof rod 1, contains two separate guideways 25 and 26 (see, FIG. 5). The guideway 25 is located on the top of the guide rail 2 and contains the sliding element 16 of the bearing unit 15 of the middle bow 4. The guideway 26 is located on the inside of the guide rail 2 and contains the sliding element 10 of the bearing unit 9 of the front bow 3. This separate accommodation of the sliding elements 10, 16 and the laterally spaced arrangement of the rests 11 and 17 of the two bearing units 9 and 1 5 make it possible for the sliding elements 10 and 16 to be pushed next to one another, and thus, also the front bow 3 to be pushed onto and over the middle bow 4 (see, FIG. 4). In this position, the front bow 3 is slightly inclined so that its rear edge 27 is raised above the middle bow 4. When the folding top is closed, the canvas folding top (only a portion of which is schematically represented as noted below) presses the front bow 3 into a roughly horizontal alignment The canvas folding top is attached to the front bow 3 and the middle bow 4. When the front bow 3 is pushed relative to the middle bow 4 and the top part 28 of the front bow travels over the blocked middle bow 4 (see, FIG. 4), a Z-shaped fold in the unattached portion of the canvas folding top (schematically represented by a broken line in FIG. 4) necessarily forms between the front bow 3 and the middle bow 4.

Figure 6:
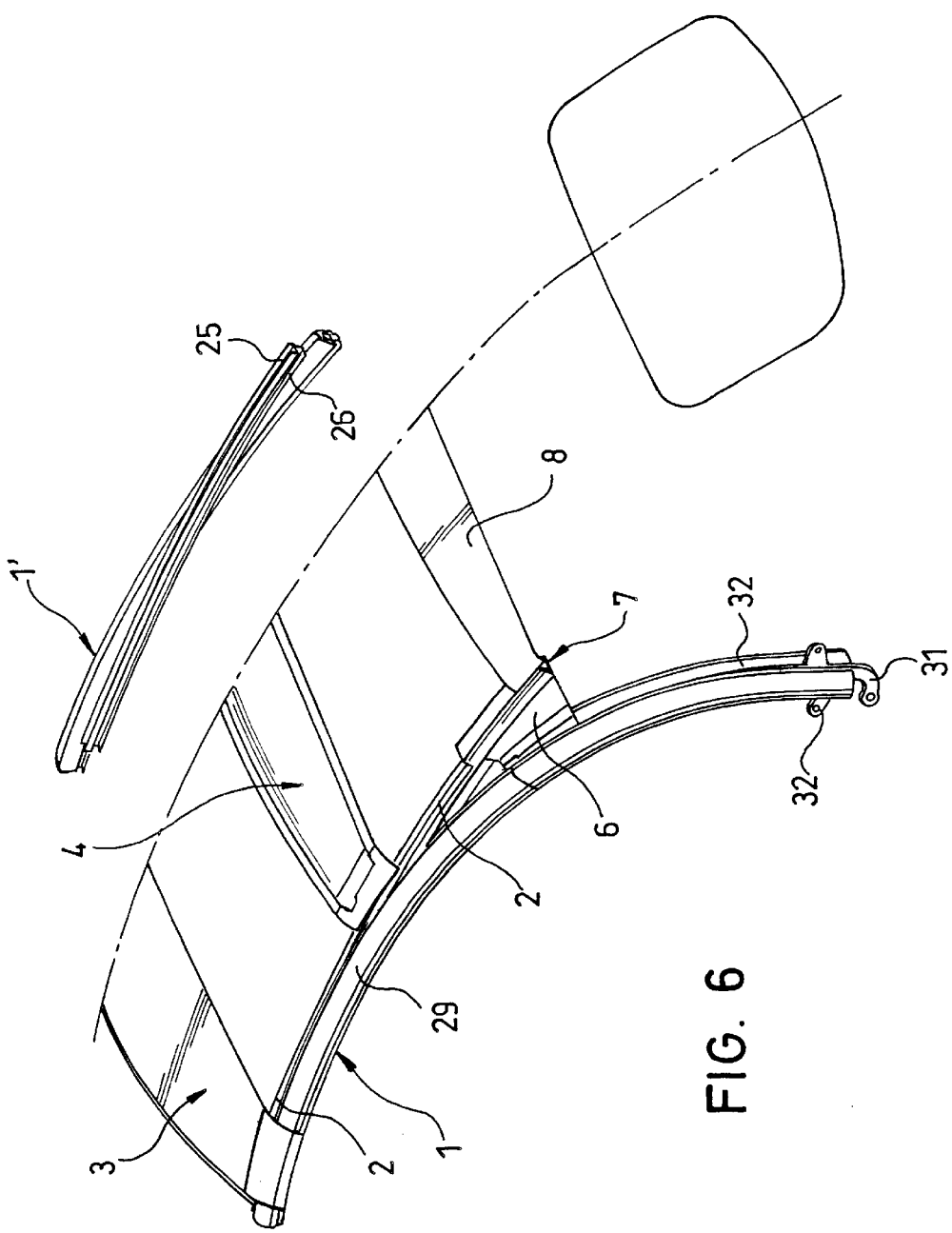
FIG. 6 is a partially exploded perspective view of the folding top mechanism of the folding roof.

FIG. 6 shows important elements of the left half of the mechanism of the folding top (and in addition the right roof rod 1') The guide rail 2 is attached inside to the roof rod 1 which has a profile seal 29 with the guideway 25 facing upward for the middle bow 4 and the guideway 26 facing inward for the front bow 3, which in the front position adjoins a wind deflector or a top windshield cross member.

Figure 7:
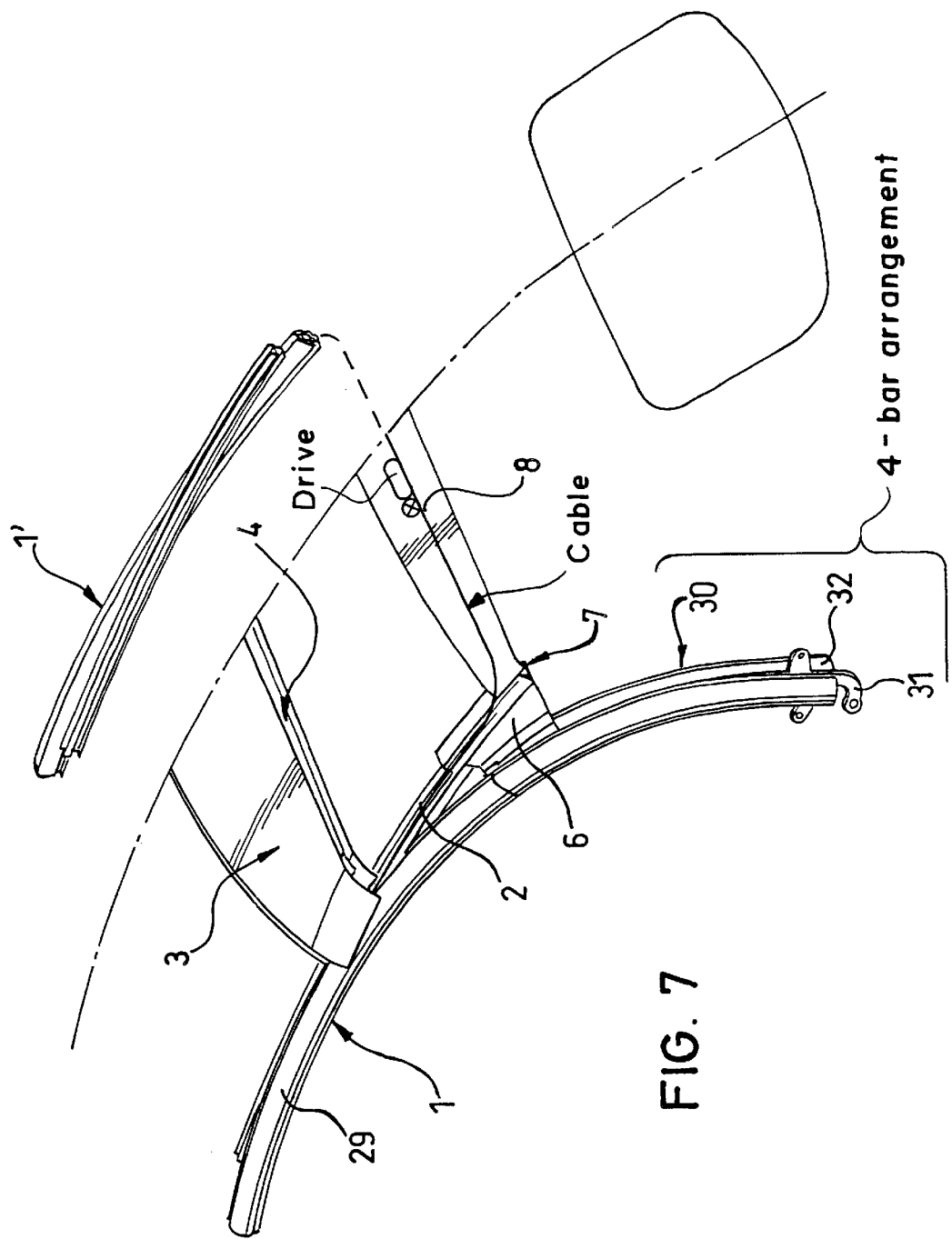
FIG. 7 is a perspective overhead view of the folding top mechanism similar to that of FIG. 6, but with the front and middle bows moved over one another.
Figure 8:
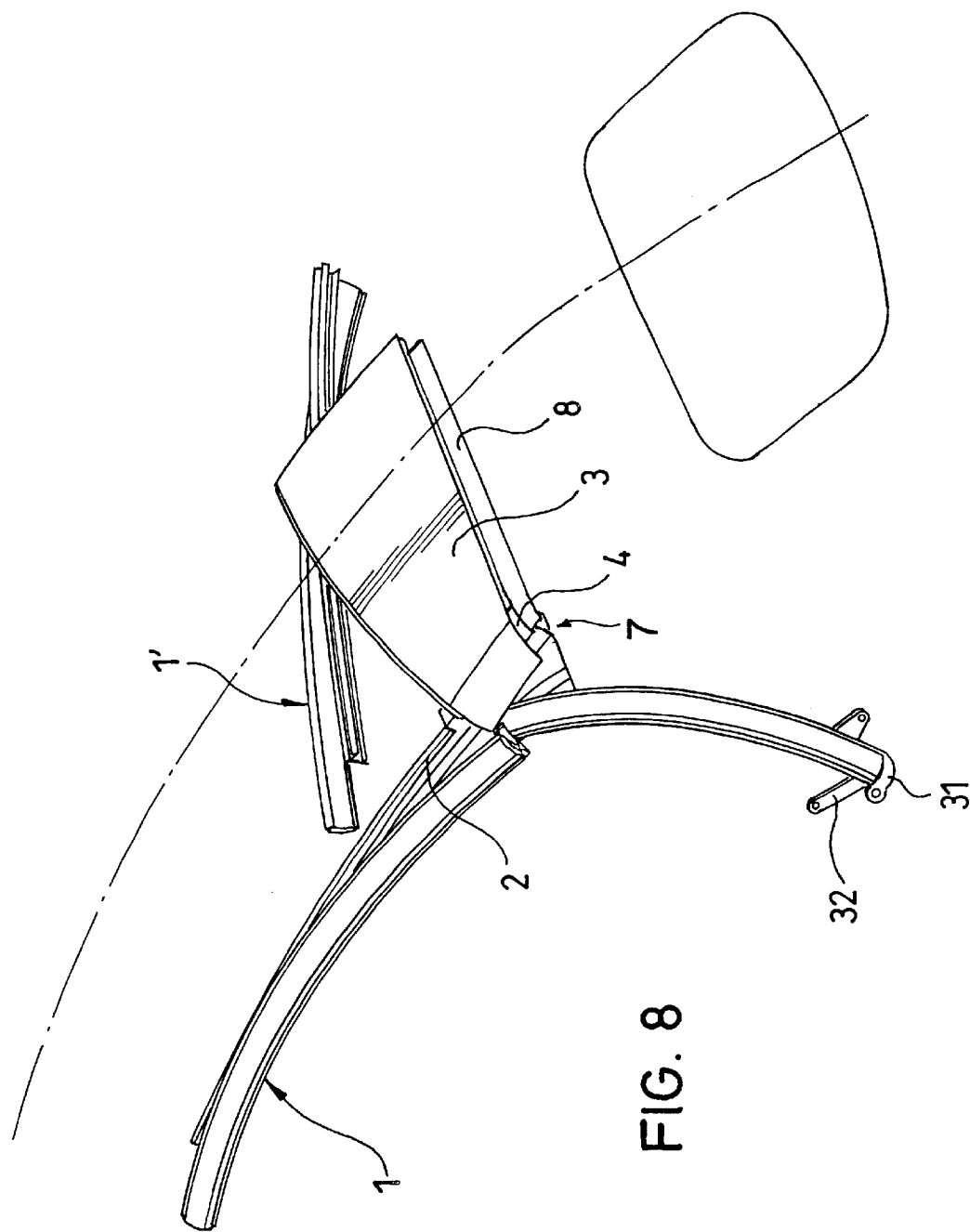
FIG. 8 is a perspective view of the folding top mechanism similar to that shown in FIG. 6, but with the front and middle bows moved over one another into a rear position.

FIG. 7 shows the front bow 3 and the middle bow 4 in its coupled arrangement pushed into and on top of one another. This unit can be pushed farther back as far as onto the roof cassette 7 (see, FIG. 8), to the side part 6 of which a guide rail corresponding to the guide rail 2 is attached or integrated. The front bow 3 and the middle bow 4 largely or completely overlap the main bow 8 in this position, in turn, a Z-fold of the canvas folding top free between the middle bow 4 and the main bow 8 being formed analogously to the first Z-fold.

The roof rod 1 is attached, for example, to the side part 6 of the roof cassette 7 via a pivot joint and is pivoted inward roughly parallel to the main bow 8 into a cross position for folding back and lowering the folding roof in a space-saving manner. The roof cassette 7 is supported via a parallelogram-like four-bar arrangement 30 with a main column 31 and a main connecting rod 32 on the body and is swung into a storage space while retaining its roughly horizontal alignment when the drive pivots the main column 31 of the main connecting rod 32.

Instead of the one middle bow 4, at a corresponding length of the folding top or the folding top mechanism, there can also be two or more middle bows in succession, and in the described way, with the formation of additional Z-folds of the canvas folding top, they can be pushed into and on top of one another. To do this, also one or more guideways for the sliding elements of the additional middle bow can be made on the guide rail. But, the sliding elements can also be held by two bows in one guideway. With a corresponding configuration of the rest and the bearing unit the two bows can still be located in and on top of one another even if the sliding elements cannot be pushed past one another, but can only be pushed against one another.

The folding top is closed by swing up the folding top mechanism out of the lowered position in the storage space and by pivoting the roof rod 1 out. The front bow 3 is pushed forward and via the driving pin 22 entrains the middle bow 4 until it reaches its blocked position (FIGS. 2 & 7) in which the lock hook 20 drops into the recess 21. At the same time, the driving pin 22 is released from its coupled engagement on the lock rocker 18 so that the front bow 3, which continues to be driven, can be pushed into its front closed position on the scoop. The canvas folding top is tensioned again.

While only a single embodiments in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Folding top mechanism of a folding roof for a convertible, comprising a front bow and a middle bow, a canvas folding top which is attached to the front bow, side roof rods with a guide means for movable support of the front bow and of the middle bow, into a rear lowered position to open the folding roof, and a lock means for fixing the middle bow on the guide means during rearward displacement of the front bow against the middle bow until the front bow is positioned in a defined arrangement on the middle bow during which the front bow is displaced by the guide means into one of a position at least partially over the middle bow or at least partially under the middle bow, and a portion of the canvas folding top at the bows is formed into a Z-fold.

2. Folding top mechanism as claimed in claim 1, wherein the canvas folding top is attached to the middle bow.

3. Folding top mechanism as claimed in claim 1, wherein a coupling means for coupling the front bow to the middle bow when said front bow is in said defined arrangement on the middle bow is provided, the middle bow being released from the guide means by the lock means so that the driven front bow and the middle bow form a movable unit.

4. Folding top mechanism as claimed in claim 1, wherein the guide means has a guide rail on the roof rod at each opposite sides of the roof.

5. Folding top mechanism as claimed in claim 4, wherein the lock means has a pre-tensioned lock rocker which is located on a bearing unit of the middle bow, said lock rocker having a lock hook which fits into a recess in the guide rail for fixing the middle bow.

6. Folding top mechanism as claimed in claim 5, wherein the lock rocker is adapted to be swung by the front bow which is pushed onto the middle bow so as to release the lock hook from said recess.

7. Folding top mechanism as claimed in claim 5, wherein the lock rocker is adapted to couple and uncouple the middle bow on the front bow.

8. Folding top mechanism as claimed in claim 1, wherein at least one additional middle bow is movably supported on the guide means and can be fixed to the first middle bow so as to be movable as a unit with the front and middle bow.

9. Folding top mechanism as claimed in claim 1, wherein the side guide rail has a respective guideway for the sliding means of each of the front bow and the middle bow so that respective sliding means of the bows can be moved next to one another.

10. Folding top mechanism as claimed in claim 9, wherein the sliding means have at least one sliding element which is movably held on the respective guideway.

11. Folding top mechanism as claimed in claim 1, wherein the side roof rod is pivotally connected by a pivot joint to a side part of a main bow; and wherein the side roof rod is adapted to be swung in about the pivot joint to lower the folding roof into a lowered position.

12. Folding top mechanism as claimed in claim 11, wherein the pivot joint is oriented to produce a motion of the side roof rod in a roughly horizontal plane.

13. Folding top mechanism as claimed in claim 1, wherein a roof cassette is formed from the side roof rods and a main bow and is pivotally supported on a body of a vehicle via a respective parallelogram-like four-bar arrangement which contains a main column and a main connecting rod.

14. Folding top mechanism as claimed in claim 1, wherein a drive for the front bow is located on a main bow and is connected via a cable to the front bow.

15. Folding top mechanism as claimed in claim 2, wherein the guide means has a guide rail on the roof rod at each opposite sides of the roof.

16. Folding top mechanism as claimed in claim 3, wherein the guide means has a guide rail on the roof rod at each opposite sides of the roof.

* * * * *